United States Patent
Ivey et al.

(10) Patent No.: US 7,324,737 B2
(45) Date of Patent: Jan. 29, 2008

(54) METHOD AND APPARATUS FOR USING STANDARD VTR TRANSPORT BUTTONS TO OPERATE A DISK RECORDER PLAYBACK DEVICE

(75) Inventors: Matthew Albert Ivey, Portland, OR (US); Brian Charles Dunn, Portland, OR (US); Mark Scott Hillebrandt, Portland, OR (US)

(73) Assignee: Thomson Licensing, Boulogne-Billancourt (FR)

( * ) Notice: Subject to any disclaimer, the term of this patent is extended or adjusted under 35 U.S.C. 154(b) by 856 days.

(21) Appl. No.: 10/812,224

(22) Filed: Mar. 29, 2004

(65) Prior Publication Data

US 2004/0208479 A1    Oct. 21, 2004

Related U.S. Application Data

(60) Provisional application No. 60/458,589, filed on Mar. 28, 2003.

(51) Int. Cl.
*H04N 5/91* (2006.01)
(52) U.S. Cl. .......................................... 386/68; 386/67
(58) Field of Classification Search .................. 386/68, 386/67, 125, 6, 7
See application file for complete search history.

(56) References Cited

U.S. PATENT DOCUMENTS

| 4,930,158 | A | * | 5/1990 | Vogel | 386/94 |
| 5,377,051 | A | * | 12/1994 | Lane et al. | 386/81 |
| 6,381,399 | B1 | * | 4/2002 | Motohashi et al. | 386/55 |
| 2003/0169815 | A1 | * | 9/2003 | Aggarwal et al. | 375/240.12 |

* cited by examiner

*Primary Examiner*—Robert Chevalier
(74) *Attorney, Agent, or Firm*—Joseph J. Laks; Robert B. Levy

(57) ABSTRACT

Briefly, there is provided a method for manipulating content stored on a disk recorder/playback device using conventional transport commands, such as those used on a conventional videotape recorder (VTR). The method commences by detecting whether the content is in one of a prescribed set of modes, and by determining whether one of a stop, normal motion, a first rapid motion or second rapid motion buttons has been actuated. Depending on which of the stop, normal motion, a first rapid mode or second rapid motion buttons, the content is advanced in one of a first and second directions. The motion of the content is controlled in accordance with the detected content mode and to the degree to which one of the first rapid motion mode and second motion mode buttons has been actuated.

11 Claims, 1 Drawing Sheet

METHOD AND APPARATUS FOR USING STANDARD VTR TRANSPORT BUTTONS TO OPERATE A DISK RECORDER PLAYBACK DEVICE

CROSS-REFERENCE TO RELATED APPLICATIONS

This application claims priority under 35 U.S.C. 119(e) to U.S. Provisional Patent Application Ser. No 60/458,589, filed Mar. 28, 2003, the teachings of which are incorporated herein.

TECHNICAL FIELD

This invention relates to a technique enabling an operator to operate a disk recorder/playback device using an a standard videotape recorder interface.

BACKGROUND ART

The term "cueing", as used in the broadcast industry refers to the process of locating a particular section of a content segment, i.e., a video or audio file, to permit playback or recording beginning at the cued section. Cueing a content segment recorded on a length of magnetic tape typically requires fast-forwarding or Rewinding the tape to locate the desired section adjacent to the playback/record head. With traditional reel-to-reel and cassette-based video and audio tape recorders, cueing a particular content segment at its beginning or end requires the tape machine operator to shuttle the tape back and forth since some amount of overshoot generally occurs when initially Rewinding and Fast-Forwarding the tape to the beginning and end of the content segment, respectively.

Presently much of the content utilized by broadcasters now exists in digital, rather than in analog format. The existence of content segments in digital format permits content storage on one or more magnetic disc drives. Indeed, companies such Thomson/Grass Valley, currently market storage systems that utilize magnetic disk drives for storing large volumes of video and audio information. The cuing of a content segment stored on a magnetic disk drive occurs in a manner somewhat differently than with a magnetic tape recorder. A content segment stored on a magnetic disc exists as a set of blocks, each comprising a string of digital characters ("ones" and "zeros"). Each such block has an address that prescribes its location on the disc. Thus, to cue a particular content segment at the beginning requires aligning an address pointer to the address of the first block of the segment of interest. This will generally entail displacing the magnetic disc pick-up head across the surface of the magnetic platter of the disc drive to locate the head above the track storing the cued section of the content segment. Playback of the segment cued in this manner takes place by retrieving the block that has its address aligned with the address pointer.

In a effort to simulate the operation of a convention magnetic videotape recorder, some magnetic storage systems provide the operator with an interface that has "Play", "Stop", "Record", "Fast-Forward" and "Rewind" buttons that provide comparable functionality to the same buttons on the magnetic tape recorder. Thus, actuating the "Play" button on a magnetic disc storage system will cause the playback of a content segment that has its address currently aligned with the address pointer, in much the same way that actuating the "Play" button on a conventional magnetic tape recorders causes playback of that content segment presently aligned with the playback head. Actuating the Fast-Forward and Rewind buttons causes the effective displacement of the content backwards and forwards relative, corresponding to the backward and forward movement of the magnetic tape on a magnetic tape recorder.

To cue a content segment at its beginning, an operator first actuates the Rewind button of the magnetic disc storage system to effectively displace the content segment to align the address pointer to the beginning block of the segment. Simply actuating the Rewind button will not by itself cue the segment to its beginning. Actuating the Rewind button effectively initiates a Rewind operation that continues until the Stop button is actuated. To cue a specific section of the content segment, an operator must make use of some type of monitoring device, such as a video monitor in the case of a video segment, to detect the beginning of the segment. The same is true when an operator initiates cueing of the end of the segment by actuating the Fast-Forward button. Only by monitoring the content segment can the operator know when the end of that content segment has been reached. Thus, even with a disc-based storage system, cueing a content segment remains problematic Thus, there is need for a technique that achieves rapid cueing of a segment stored on a magnetic disk storage system to align the segment at its beginning or end.

BRIEF SUMMARY OF THE INVENTION

Briefly, there is provided a method for manipulating content stored on a disk recorder/playback device using conventional transport commands, such as those used on a conventional videotape recorder (VTR). The method commences by detecting whether the content is in one of a prescribed set of modes, and by determining whether one of a stop, normal motion, a first rapid motion or second rapid motion buttons has been actuated. Depending on which of the stop, normal motion, a first rapid mode or second rapid motion buttons, the content is advanced in one of a first and second directions. The motion of the content is controlled in accordance with the detected content mode and to the degree to which one of the first rapid motion mode and second motion mode buttons has been actuated.

DETAILED DESCRIPTION

Figure 1:
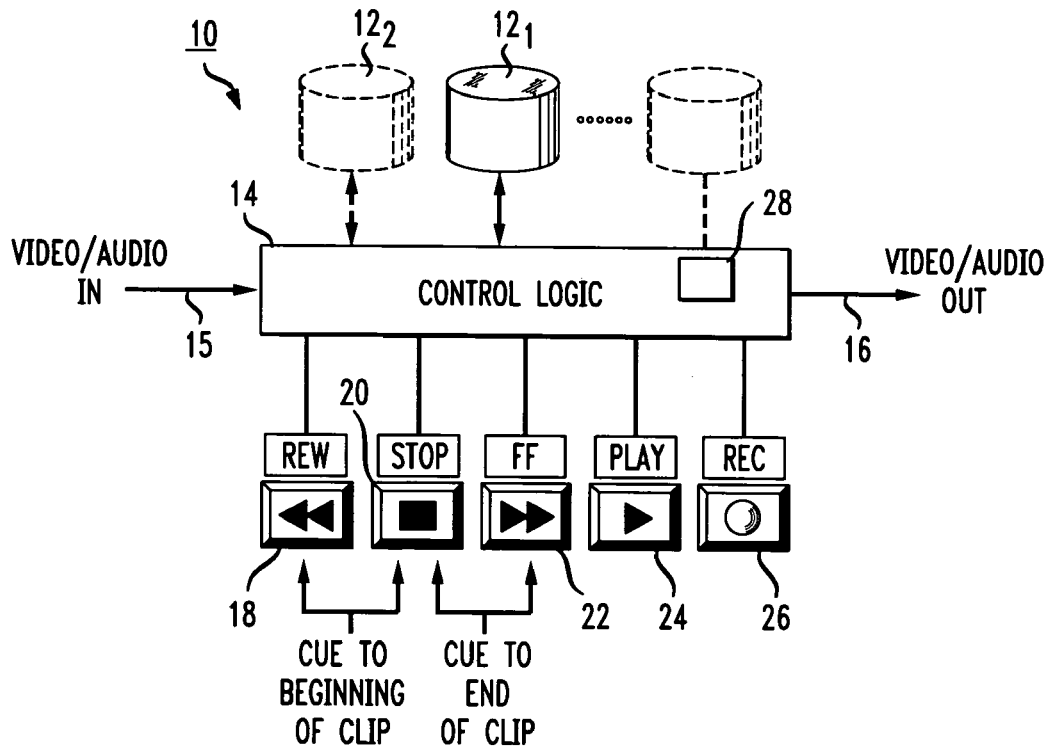
FIG. 1 illustrates a block schematic diagram of an apparatus in accordance with a preferred for cueing a content segment in accordance with the present principles.

FIG. 1 depicts a disk recorder/playback device 10 in accordance with an illustrated embodiment of the present principles for storing content segments and for cueing such segments. Each content segment typically takes the form of a digitized video file with or without embedded audio, or digitized audio file. The disk recorder/playback device 10 includes at least one, and preferably, a plurality of magnetic storage devices $12_1$, $12_2$ ... $12_n$, each typically comprising a single magnetic disc drive, or an array of disc drives. Although not shown, each such magnetic disc drive has at least one rotating magnetic platter and an arm, which moves across the platter to position a pick-up head on the arm in spaced relationship from a track on the platter for reading and writing content segments.

The magnetic storage devices $12_1$-$12_n$ each operate under the control of a control logic unit 14, which typically includes microprocessor-based controller. The control unit 14 has at least one input 15 for receiving one or more content segments. Content segments received at the input 15 of the control logic unit 14 undergo storage in one or more of the magnetic storage devices $12_1$-$12_n$ thus permitting retrieval on an output 16 of the logic control output.

In an effort to simulate the operation of a conventional magnetic tape recorder, the disk recorder/playback device 10 includes buttons 18, 20, 22, 24 and 26, which simulate the following operations:

| Button | Operation |
|---|---|
| 18 | Rewind (REV) |
| 20 | Stop |
| 22 | Fast Forward (FWD) |
| 24 | Play |
| 26 | Record |

Thus, for example, actuating the button 24 causes the control logic unit 14 to commence playback of a content segment at an identified address. Actuating the button 26 initiates recording of a content segment. Buttons 18 and 22, when actuated, cause the control logic unit 14 to effectively Rewind and fast-forward the content segment to align a particular block of the content segment for subsequent recording or playback. The button 20, when actuated, stops an operation previously initiated by actuating one of the buttons 18, 22, 24 or 26. The buttons 18-26 correspond to the same motion control/mode buttons on a conventional videotape recorder. Using the same motion control/mode buttons on the disk recorder/playback device 10 as a conventional videotape recorder allows for a common interface format.

In addition to receiving input information via actuation of the buttons 18-26, the control logic 14 receives input information from one or more other input devices, such as a keyboard, that enables the entry of information identifying a stored content segment. A look-up table 28 within the control logic unit 14 associates the identity of the content segment with the particular one of the discs $12_1$-$12_n$ storing the content, as well as the address of the beginning and ending blocks of that content segment to facilitate playback as well as cueing. While the look-up table 28 appears physically within the control logic unit 14 of FIG. 1, the table could reside elsewhere, such as on one of the magnetic storage devices $12_1$-$12_n$.

Heretofore, to cue a content segment at its beginning or end, an operator would have to actuate the Rewind (REV) and Fast-Forward (FWD) buttons 18 and 26, respectively, while monitoring the content segment to detect the beginning and end, respectively. The need to monitor the content while selectively actuating the Rewind and Fast Forward buttons 18 and 26 can prove cumbersome, and time consuming, In accordance with the present principles, the control logic unit 14 advantageously accomplishes manipulation (i.e., cueing, fast-forwarding, rewinding and advancing successive content segments in response to actuation selective actuation of one or more of the STOP button 20, the PLAY button 24 the REV and FWD Buttons 18, and 22, respectively. To cue a content segment at its beginning, an operator actuates the STOP button 20 and the REV button 18. Conversely, to cue a content segment at its end, the operator actuates the STOP button 20 and the FWD button 22. Other operations to manipulate the content segment will be discussed hereinafter.

Figure 2:
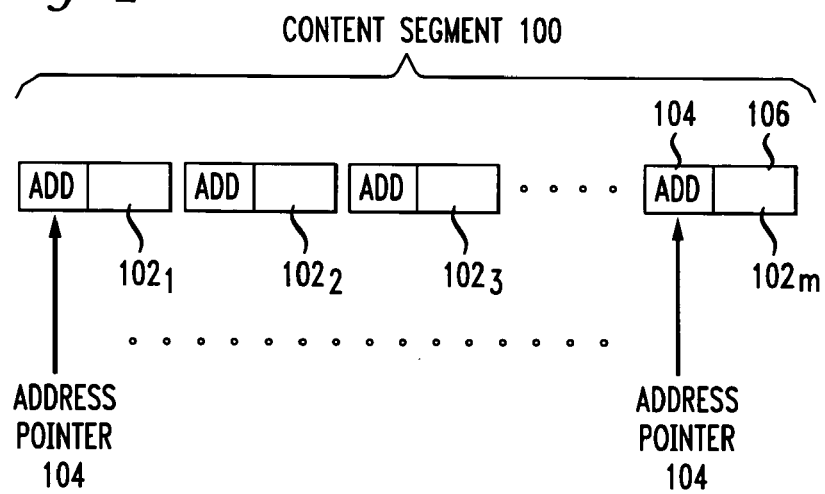
FIG. 2 illustrates the manner in which a content segment is cued by the apparatus of FIG. 1.

To better understand the manner in which content segment manipulation occurs, refer to FIG. 2, which depicts an illustrative content segment 100. As discussed previously, each content segment, such as segment 100 of FIG. 2, comprises one or more blocks, illustratively depicted as blocks $102_1$, $102_2$, $102_3$ . . . $102_m$ in FIG. 2. Each of blocks $102_1$-$102_m$ has an address 104 that holds an address specifying the storage location of the block, and a payload 106 that holds the portion of content segment stored in the block. An address pointer 104 maintained by the control logic unit 14 of FIG. 1 serves to identify (i.e., "point to") the address of the block of the content segment 100 awaiting playback or recording. In practice, the address pointer 108 will typically take the form of a register location (not shown) in the control logic unit 14 of FIG. 1 that temporarily holds the address of such a block.

Actuation of the STOP button 20 and the REV button 18 causes the control logic unit to effectively displace the content segment to align the address pointer 104 with the address of the first block (i.e., block $102_1$) of the content segment 100, thus cueing the segment at its beginning. By the same token, actuation of the STOP button 20 and the FWD button 22 causes the control logic unit to effectively displace the content segment to align the address pointer 104 with the address of the last block (i.e., block $102_m$) of the content segment 100. In actuality, the control logic unit 14 of FIG. 1 effectively displaces content segment by causing the pick-up arm of the magnetic disc storage device to move across the magnetic platter so as to align the pick-up head with the track on which the first of lack block of the content segment is stored so as to align the address pointer 104 with address of that block.

The cueing operation achieved by actuating the STOP button 20 and one of the REV and FWD 18 and 22, respectively, occurs automatically. In displace of initiating a cueing operation, the control logic unit 14 will know the address of the starting and ending blocks of the content segment of interest from the look-up table 28. Prior to initiating a cueing operation, the operator will typically identify the content segment on interest, either by name or code word. Using the look-up table 28 of FIG. 1, the control logic unit 14 will determine the addresses of the starting and ending blocks of the segment. Upon detecting the actuation of the STOP button 20 and one of the REV and FWD buttons 18 and 22, the control logic unit 14 of FIG. 1 will then effectively displace the content segment in the manner described to appropriately align the address pointer 104 of FIG. 2 to effect cueing of the beginning or end of content segment automatically. Thus, the control logic 14 unit accomplishes cueing of the beginning and ending of the content segment without the need any monitoring by the operator.

The disk recorder/playback device 10 also affords the following operating modes as well:

Single Frame Advance

With a content segment loaded in the disk recorder/playback device 10 and the content segment is in STOP mode, momentarily pressing the FWD or REV buttons 18 and 22, respectively, advances or reverses the content segment one frame at a time. This function is very useful in finding a specific frame to use as an IN or OUT point for editing.

Shuttle Mode

With a content segment loaded in the disk recorder/playback device 10 and the content segment is in STOP mode, pressing in and holding the one of the FWD or REV buttons 18 and 22 causes the disk recorder/playback device 10 to fast forward or rewind the content segment, respectively, in a shuttle mode. Releasing the actuated one of the FWD or RV buttons causes the content segment to stop. This function affords a handy way of quickly reviewing material.

With a content segment loaded in the disk recorder/playback device 10 and the content segment is in a PLAY mode, pressing in and holding one of the FWD or REV buttons 18 and 22 causes the disk recorder/playback device 10 to fast forward or rewind the content segment, respectively, in a shuttle mode. Releasing the actuated one of the FWD or REV buttons causes the content segment to stay in locked in the respective fast forward or rewind shuttle modes, respectively, until the content segment either reaches the end or the STOP button 20 is pressed. This function affords a handy way of quickly reviewing material.

Play List Content Segment Advance

In a Play List mode, actuating the STOP 20 button and one of the FWD or REV buttons 18 and 22 allows for navigation to different content segments in a Play List established by an operator. For example, an operator can advance to the next content segment or go back to a to a previous content segment in the Play List.

Random Play List Access

In the Play List mode, pressing the STOP 20 causes the disk recorder/playback device 10 to automatically advance to a designated content segment in the Play List content segment and cue that content segment for playback or recording. This functionality the allows the disk recorder/playback device 10 to operate as a "shot box" to randomly access every content segment in the Play List.

In Play list mode, pressing PLAY button 24 causes the disk recorder/playback device 10 to automatically advance to a designated content segment in the Play List content segment and play the content segment. This functionality the allows the disk recorder/playback device 10 to operate as a "shot box" to randomly access every content segment in the Play List.

The foregoing describes a technique for manipulating content segments stored by a disk recorder/playback device.

What is claimed is:

1. A method for manipulating content stored on a disk recorder/playback device using conventional transport commands, comprising the steps of:
    detecting which of a prescribed of a prescribed set of content modes currently exists;
    determining which of a set of transport commands has been actuated and to what degree;
    advancing the content in one of a first and second directions depending on the which of the motion commands has been actuated, while
    controlling the motion of the content in accordance with the detected content mode and in accordance with the transport command and the degree to which that command is actuated.

2. The method according to claim 1 wherein the prescribed set of content modes include a STOP content mode and a PLAY content mode.

3. The method according to claim 1 wherein the set of transport commands include a STOP command, a PLAY command, a Fast Forward (FWD) command and a REWIND (REV) command.

4. The method according to claim 2 wherein the set of transport commands include a STOP command, a PLAY command, a Fast Forward (FWD) command and a REWIND (REV) command.

5. The method according to claim 4 wherein the advancing step includes advancing the content in one of a forward direction and reverse directions responsive to momentary actuation of one of the FWD and REV transport commands and wherein the step of controlling the motion of the content includes displacing the content by a frame when the content is in the STOP mode.

6. The method according to claim 4 wherein the advancing step includes advancing the content in one of a forward direction and reverse directions responsive to continued actuation of the FWD and REV transport commands, respectively, and wherein the step of controlling the motion of the content includes shuttling the content when the content is in the STOP mode and ceasing the shuttling of the content upon de-actuation of the respective one of the FWD and REV transport commands.

7. The method according to claim 4 wherein the advancing step includes advancing the content in one of a forward direction and reverse directions responsive to actuation of the FWD and REV transport commands, respectively, and wherein the step of controlling the motion of the content includes shuttling the content when the content is in the PLAY mode and ceasing the shuttling of the content upon actuation of a STOP transport command.

8. The method according to claim 4 wherein the advancing step includes advancing the content in one of a forward direction and reverse directions responsive to actuation of the FWD and REV transport commands, respectively, and the STOP transport command wherein the step of controlling the motion of the content includes navigating to one of a successive or preceding segment of the content when the content is in the PLAY LIST mode.

9. The method according to claim 4 wherein the advancing step includes advancing the content in one of a forward direction and reverse directions responsive to actuation of the FWD and REV transport commands, respectively, and the STOP transport command wherein the step of controlling the motion of the content includes navigating to one of a successive or preceding segment of the content when the content is in the PLAY LIST mode.

10. The method according to claim 4 wherein the advancing step includes advancing the content to a particular segment responsive to selection of that content segment wherein the step of controlling the motion of the content includes cueing the content to one of a successive or preceding segment of the content when the content is in the PLAY LIST mode.

11. The method according to claim 4 wherein the advancing step includes advancing the content to a particular segment responsive to selection of that content segment wherein the step of controlling the motion of the content includes playing the content segment responsive to a PLAY transport mode command when the content is in the PLAY LIST mode.

* * * * *